(12) United States Patent
Liu

(10) Patent No.: US 12,096,520 B2
(45) Date of Patent: Sep. 17, 2024

(54) METHOD FOR DETERMINING TERMINAL CAPABILITY MESSAGE FORMAT, NETWORK DEVICE AND SERVER

(71) Applicant: GUANGDONG OPPO MOBILE TELECOMMUNICATIONS CORP., LTD., Dongguan (CN)

(72) Inventor: Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 372 days.

(21) Appl. No.: 17/523,622

(22) Filed: Nov. 10, 2021

(65) Prior Publication Data

US 2022/0070661 A1 Mar. 3, 2022

Related U.S. Application Data

(63) Continuation of application No. PCT/CN2020/075602, filed on Feb. 17, 2020.

(51) Int. Cl.
*H04W 8/24* (2009.01)
(52) U.S. Cl.
CPC .................... *H04W 8/24* (2013.01)
(58) Field of Classification Search
CPC .................. H04L 12/00; H04W 8/24
See application file for complete search history.

(56) References Cited

U.S. PATENT DOCUMENTS

| 2019/0394668 | A1* | 12/2019 | Shaheen | H04W 72/51 |
| 2020/0099501 | A1* | 3/2020 | Jia | H04L 5/14 |
| 2022/0086625 | A1* | 3/2022 | Jin | H04W 72/04 |
| 2023/0239683 | A1* | 7/2023 | Xu | H04W 8/22 |
| | | | | 370/328 |

FOREIGN PATENT DOCUMENTS

| CN | 101540970 A | 9/2009 |
| CN | 105227469 A | 1/2016 |
| CN | 108471626 A | 8/2018 |
| CN | 110505707 A | 11/2019 |
| WO | 2010127482 A1 | 11/2010 |

OTHER PUBLICATIONS

First Office Action issued in corresponding Chinese application No. 202080031888.9, mailed May 26, 2023.
International Search Report issued in corresponding International Application No. PCT/CN2020/075602, mailed Nov. 11, 2020, 30 pages.

(Continued)

*Primary Examiner* — Congvan Tran
(74) *Attorney, Agent, or Firm* — BAYES PLLC

(57) ABSTRACT

The present disclosure relates to a method for determining a terminal capability message format and a server. The method is applied to a first network device and includes obtaining terminal capability information, the terminal capability information being defined by a first message format. The method further includes decoding the terminal capability information using the first message format.

1 Claim, 8 Drawing Sheets

(56) References Cited

OTHER PUBLICATIONS

PCT Written Opinion of the International Searching Authority issued in corresponding International Application No. PCT/CN2020/075602, mailed Nov. 11, 2020, 9 pages.

"3rd Generation Partnership Project; Technical Specification Group Radio Access Network; NG-RAN; NG Application Protocol (NGAP) (Release 15)", 3GPP TS 38.413 V15.5.0 (Sep. 2019), 329 pages.

"Signalling Procedures Containing UE Capability ID", Agenda Item: 11.5.2, Source: CATT, 3GPP TSG-RAN WG2 Meeting #106 R2-1906450, Reno, USA, May 13-17, 2019, 4 pages.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.18.0 (Mar. 2019), 460 pages.

"3rd Generation Partnership Project; Technical Specification Group Radio Access Network; NR; Radio Resource Control (RRC) protocol specification (Release 15)", 3GPP TS 38.331 V15.7.0 (Sep. 2019), 526 pages.

"3rd Generation Partnership Project; Technical Specification Group Radio Access Network NR Radio Resource Control (RRC) protocol specification (Release 15)", 3GPP TS 38.331 V15.0.0 (Dec. 2017), 188 pages.

"On the storage of UE Capability ID in RAN side", Agenda Item: 11.5.2, Source: Huawei, HiSilicon, 3GPP TSG-RAN2 Meeting#106, R2-1907224, Reno, USA, May 13-17, 2019, 2 pages.

"3rd Generation Partnership Project; Technical Specification Group Services and System Aspects; System Architecture for the 5G System (5GS); Stage 2 (Release 16)", 3GPP TS 23.501 V16.2.0 (Sep. 2019), 389 pages.

"Some remaining issues on UE capability ID", Agenda item: 6.5.2, Source: Spreadtrum Communications, 3GPP TSG-RAN WG2 Meeting #107Bis, R2-1912249, Chongqing, China, Oct. 14-18, 2019, 3 pages.

"RACS work in RAN3", Agenda Item: 30.3, Source: Ericsson, 3GPP TSG-RAN WG3 Meeting #106, R3-197382, Reno, Nevada, US, Nov. 18-22, 2019, 6 pages.

Extended European Search Report issued in corresponding European application No. 20920267.0, mailed Aug. 5, 2022.

Qualcomm Incorporated, "RACS impacts in RAN3 specifications", R3-200287, 3GPP TSG-RAN WG3 Meeting#107-e Feb. 24-28, 2020.

Ericsson, "Format of Capability Information", Tdoc R2-1907341, 3GPP TSG-RAN WG2 #106 Reno, Nevada, US, May 13-17, 2019.

CT3, "LS on encoding of UE radio capabilities", R2-1912005, 3GPP TSG RAN WG2#107bis Chongqing, China, Oct. 14-18, 2019.

Ericsson, "Discussion on the protocol selection for UCMF-MME interface", C4-192157, 3GPP TSG CT WG4 Meeting #91 Reno, US; May 13-17, 2019.

Spreadtrum Communications, "Container combination of UE capability ID", R2-1909089, 3GPP TSG-RAN WG2 Meeting #107 Prague, Czech Republic, Aug. 26-30, 2019.

3GPP TS 23.501 V16.3.0 (Dec. 2019); Technical Specification Group Services and System Aspects; System architecture for the 5G System (5GS); Stage 2 (Release 16)-XP051840930.

Second Office Action issued in corresponding Chinese application No. 202080031888.9, mailed Jan. 5, 2024.

Notice of Allowance issued in corresponding Chinese application No. 202080031888.9, mailed Mar. 21, 2024.

\* cited by examiner

500

Obtaining the terminal capability information corresponding to the terminal capability identifier base on a mapping relationship between the terminal capability information and a corresponding terminal capability identifier; wherein the mapping relationship being searched base on the terminal capability identifier — S411

Sending the terminal capability information — S412

Receiving the terminal capability information from the first network device, the terminal capability information being defined by the first message format — S610

Assigning a corresponding terminal capability identifier to the terminal capability information, recording a mapping relationship between the terminal capability information and the corresponding terminal capability identifier — S620

Sending terminal capability information to a first network device, the terminal capability information being defined by a preset first message format — S410

FIG.6

METHOD FOR DETERMINING TERMINAL CAPABILITY MESSAGE FORMAT, NETWORK DEVICE AND SERVER

CROSS-REFERENCE TO RELATED APPLICATION

This application is a continuation of the International Application No. PCT/CN2020/075602, filed on Feb. 17, 2020, the entire contents of which are incorporated herein by reference.

BACKGROUND

The present disclosure relates to the field of communications, and in particular, to a method for determining terminal capability message format, network equipment, and server.

The user equipment (UE) radio access capability information, referred to as terminal capability information, can be indicated by UE radio capability ID. The UE radio capability ID can be referred to as the UE capability ID. There can be two types of UE capability IDs, one is the capability ID assigned by the UE manufacturer, and the other is the capability ID assigned by the UE capability management function (UCMF).

When assigning UE capability ID to terminal capability information, the access and mobility management function (AMF) receives the terminal capability information of the UE and sends the terminal capability information to the UCMF; the UCMF assigns the corresponding UE capability ID to the terminal capability information and returns the assigned UE capability ID to the AMF. The AMF then sends the UE capability ID down to the UE. For the above-mentioned UE capability ID assigned by the UE manufacturer, the UE manufacturer shall provide the mapping relationship between the terminal capability information and the corresponding UE capability ID to the UCMF, so that the UCMF assigns the corresponding UE capability ID to the terminal capability information; for the above-mentioned UE capability ID assigned by the UCMF, After the UCMF assigns UE capability ID for the terminal capability information, the mapping relationship between the terminal capability information and the corresponding terminal capability identifiers is reserved.

After assigning the UE capability ID, in the subsequent access process, the UE can report the UE capability ID corresponding to its own terminal capability information, and the next generation-radio access network (NG-RAN) node will report the UE capability ID to the UCMF via the AMF, and obtain the terminal capability information corresponding to the UE capability ID from the UCMF. NG-RAN nodes have different types of radio access technology (RAT), such as new radio (NR) type and evolved universal mobile telecommunications system (UMTS) terrestrial radio access (E-UTRA) type. NG-RAN nodes of different RAT types use different message formats to decode the acquired terminal capability information. Therefore, if the NG-RAN node cannot determine its own RAT type, it cannot adopt the appropriate message format to decode the acquired terminal capability information. As can be seen, the implementation process of the existing terminal capability message formats is more complicated.

BRIEF DESCRIPTION OF DRAWINGS

FIG. 5 is a flowchart of step S410 in a method 400 for determining a terminal capability message format according to an embodiment of the present disclosure;

FIG. 6 is a flowchart of a method 600 of determining a terminal capability message format according to an embodiment of the present disclosure;

DETAILED DESCRIPTION

Figure 1:
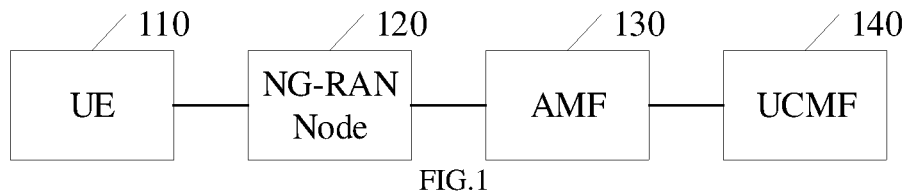
FIG. 1 is a schematic diagram of an application scenario of an embodiment of the present disclosure.

A technical solution of embodiments of the present disclosure will be described below with reference to the drawings.

The technical solutions of embodiments of the present disclosure can be applied to various communication systems, such as a global system of mobile communication (GSMC) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communication system, a future 5th generation (5G) system or other communication systems.

Generally speaking, conventional communication systems support a limited number of connections and are easy to implement. However, with the development of communication technology, mobile communication systems will support not only conventional communication, but also, for example, device-to-device (D2D) communication, machine-to-machine (M2M) communication, machine-type communication (MTC), and vehicle-to-vehicle (V2V) communication, machine type communication (MTC), and vehicle to vehicle (V2V) communication, etc., to which embodiments of the present disclosure may also be applied.

In at least one exemplary embodiment, the communication system in embodiments of the present disclosure can be applied to carrier aggregation (CA) scenario, or dual connectivity (DC), or standalone (SA) deployment scenario.

Embodiments of the present disclosure are not limited to the applied spectrum. For example, this application embodiment can be applied to authorized spectrum or to license-free spectrum.

Embodiments of the present disclosure describe individual embodiments in conjunction with network equipment and terminal equipment, where the terminal equipment may also be referred to as a user Equipment (UE), an access UE, a user unit, a user station, a mobile station, a mobile station, a remote station, a remote terminal, a mobile device, a user terminal, a terminal, a wireless communication device, a user agent, or a user device, etc. The UE may also be a station ST in a WLAN, a cellular telephone, a cordless telephone, a session initiation protocol (SIP) telephone, a wireless local loop (WLL) station, a personal digital assistant (PDA) devices, a handheld device with wireless communication function, a computing device or other processing devices connected to a wireless modem, an in-vehicle device, a wearable device, a UE in a future 5G network, or a UE in a future evolutional public land mobile network (public land mobile network, PLMN), which is not limited in embodiments of the present disclosure.

By way of example and not limitation, in embodiments of the present disclosure, the terminal device may also be a wearable device. A wearable device can also be called a wearable smart device, which is the general term for the application of wearable technology in the intelligent design of daily wear and the development of wearable devices, such as glasses, gloves, watches, clothing, and shoes. A wearable device is a portable device that is worn directly on the body or integrated into the user's clothing or accessories. Wearable device is not only a hardware device, but also a device that achieves powerful function through software support, data interaction, and cloud interaction. Broadly speaking, wearable smart devices include full-featured, large-sized devices that can achieve complete or partial functions without relying on smartphones, such as smart watches or smart glasses, as well as smart bracelets and smart jewelry that focus only on a certain type of application and need to be used in conjunction with other devices such as smartphones, such as various types of physical signs monitoring.

The network device can be used to communicate with the mobile device. The network devices can be an access point (AP) in WLAN, a base transceiver station (BTS) in GSM or CDMA, or a NodeB (NB) in WCDMA, and also be an evolutional node B (eNB or eNodeB) in LTE, or a relay station or an access point, or a vehicle-mounted device, a wearable device, and a network device in a gNB in NR network or a network device in future evolved PLMN network, etc.

In embodiments of the present disclosure, the network device provides service to a cell, and the terminal device communicates with the network device through the transmission resources (e.g., frequency domain resources, or spectrum resources) used by the cell. The cell can correspond to the network device (e.g., base station), and the cell can belong to the macro base station or the base station corresponding to a small cell. The small cells can include metro cell, micro cell, pico cell and femto cell, etc. These small cells have the characteristics of small coverage area and low transmitting power, and these small cells are suitable for providing high speed data transmission service.

FIG. 1 illustrates exemplarily a wireless communication system 100. In at least one exemplary embodiment, the wireless communication system 100 may include a UE 110, an NG-RAN node 120, an AMF 130, and a UCMF 140, and embodiments of the present disclosure may apply the communication system shown in FIG. 1.

It should be understood that the terms "system" and "network" are often used interchangeably in this disclosure. The term "and/or" herein merely refers to an association relationship describing associated objects, indicating that there may be three kinds of relationships, for example, A and/or B can may represent the following three situations: A exists alone, A and B exist simultaneously, B exists alone. In addition, the character "/" herein generally indicates that the related objects share an "or" relationship.

Figure 2:
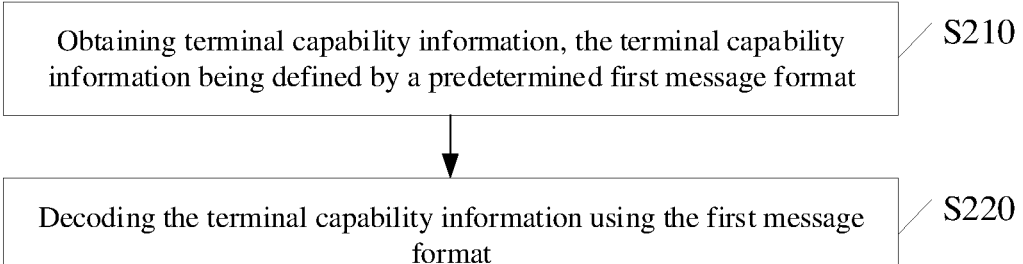
FIG. 2 is a flowchart of a method 200 for determining a terminal capability message format according to an embodiment of the present disclosure.

A method for determining a terminal capability message format, which is applied to a first network device, is provided by embodiments of the present disclosure, and FIG. 2 is a schematic flowchart of a method 200 for determining a terminal capability message format according to embodiments of the present disclosure including the following steps.

S210: obtaining terminal capability information, the terminal capability information being defined using a preset first message format.

S220: decoding the terminal capability information using the first message format.

In a possible implementation manner of the present embodiment, the above-mentioned first network device is an NG-RAN node.

Since a preset first message format is adopted, the first network device, after receiving the terminal capability information defined using this first message format, does not need to select the corresponding message format according to its own RAT type, but can directly decode the first terminal information using this preset first message format. Thus, the complexity of the terminal capability decoding process is reduced.

In at least one exemplary embodiment, the first message format is a format defined in TS 36.331 which is one of a 3GPP protocol version or a format defined in TS 38.331 which is another of the 3GPP protocol version; or, a radio resource control RRC message format defined by new radio NR or an RRC message format defined by E-UTRAN; or a format associated with a core network or an access network.

In at least one exemplary embodiment, the format associated with a core or an access network includes a format associated with a mobility management node function MME; or, a format associated with an access and mobility management function AMF; or a format associated with an access network node of NR type; or a format associated with an access network node of E-UTRA type.

In at least one exemplary embodiment, before obtaining the terminal capability information, it further includes receiving a terminal capability identifier from the UE.

In at least one exemplary embodiment, the NG-RAN node obtains the UE capability identifier.

In at least one exemplary embodiment, the above step S210 includes sending the terminal capability identifier to a second network device; and receiving terminal capability information corresponding to the terminal capability identifier.

In at least one exemplary embodiment, the second network device is a UCMF. The NG-RAN node is configured to send the terminal capability identifier to the UCMF through the AMF, and the UCMF is configured to return the terminal capability information corresponding to the terminal capability identifier to the NG-RAN node through the AMF.

Figure 3:
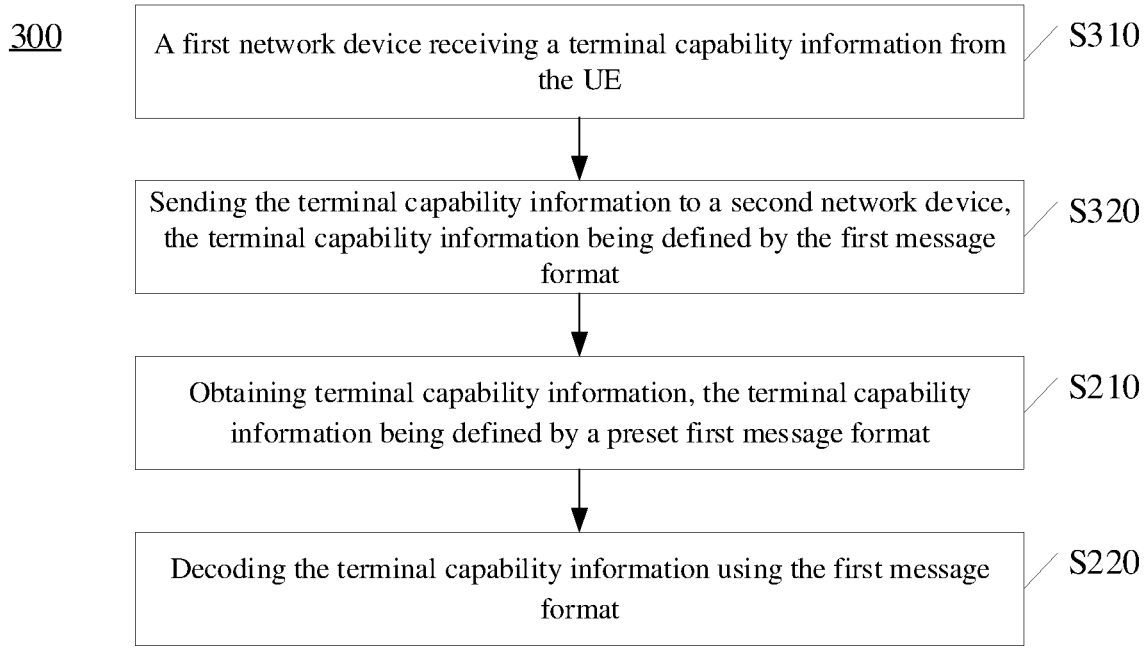
FIG. 3 is a flowchart of a method 300 for determining a terminal capability message format according to an embodiment of the present disclosure.

A method 300 for determining a terminal capability message format, as shown in FIG. 3, before the step S210 above, may further include a process of assigning terminal capability identifiers, which is illustrated in the following steps.

S310: The first network device (e.g., NG-RAN node) receives a terminal capability information from the UE.

S320: The first network device sends the terminal capability information to a second network device (e.g., UCMF), the terminal capability information being defined using the first message format.

In the specific implementation process, the NG-RAN node can send the terminal capability information defined using the first message format to the AMF, which sends the terminal capability information to the UCMF; after the UCMF assigns the corresponding terminal capability identifier to the terminal capability information, it sends the terminal capability identifier to the AMF, which then returns the assigned terminal capability identifier to the terminal device.

Figure 4:
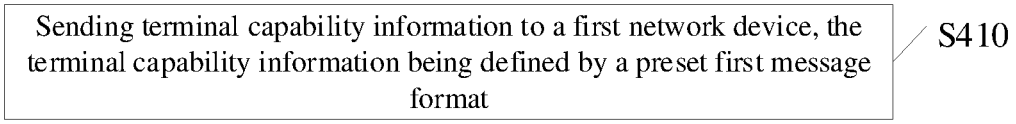
FIG. 4 is a flowchart of a method 400 of determining a terminal capability message format according to an embodiment of the present disclosure.

Another method for determining a terminal capability message format, which is applied to a second network device, and FIG. 4 is a flowchart of the implementation of a method 400 for determining a terminal capability message format according to embodiments of the present disclosure, includes S410: sending terminal capability information to a first network device, the terminal capability information being defined using a preset first message format.

In at least one exemplary embodiment, the above-mentioned first network device is an NG-RAN node, and the above-mentioned second network device is a UCMF. Since there is no interface between the NG-RAN node and the UCMF, the exchange of information between the first network device and the second network device is realized through the AMF. Corresponding to the step S410 above, the NG-RAN node sends the terminal capability identifier to the AMF, which then transmits the terminal capability identifier to the UCMF. Corresponding to the step S420 above, the UCMF sends the terminal capability information corresponding to the terminal capability identifier to the AMF, which in turn transmits the terminal capability information to the NG-RAN node.

Since the second network device adopts the preset first message format to define the terminal information capability, it can ensure that the first network device can adopt the preset first message format to decode the received terminal capability information, thus reducing the complexity of the terminal capability decoding process.

Since the second network device adopts the preset first message format to define the terminal information capability, it can ensure that the first network device can adopt the preset first message format to decode the received terminal capability information, thereby reducing the complexity of the terminal capability decoding process.

In at least one exemplary embodiment, the first message format is a format defined in TS 36.331 or a format defined in TS 38.331; or, a radio resource control RRC message format defined by new radio NR or an RRC message format defined by E-UTRAN; or a format associated with a core network or an access network.

In at least one exemplary embodiment, the format associated with a core or an access network includes a format associated with a mobility management node function MME; a format associated with an access and mobility management function AMF; a format associated with an access network node of NR type; or a format associated with an access network node of E-UTRA type.

FIG. 5 is a flowchart of the implementation of a method 500 for determining a terminal capability message format according to embodiments of the present disclosure. As show in the FIG. 5, the above step S410 may include the followings.

S411: obtaining the terminal capability information corresponding to the terminal capability identifier based on a mapping relationship between the terminal capability information and a corresponding terminal capability identifier; where the mapping relationship being searched is based on the terminal capability identifier.

S412: sending the terminal capability information.

Corresponding to the above two terminal capability identifiers, before the step S410, the UCMF may use two different ways to assign the corresponding terminal capability identifier to the terminal capability information.

In the first way, the terminal capability identifier is assigned by the UCMF. A method 600 for determining a terminal capability message format as shown in FIG. 6, before the above step S410, further includes the followings.

S610: receiving the terminal capability information from the first network device, and the terminal capability information is defined using the first message format.

S620: assigning a corresponding terminal capability identifier to the terminal capability information, recording a mapping relationship between the terminal capability information and the corresponding terminal capability identifier.

Figure 7:
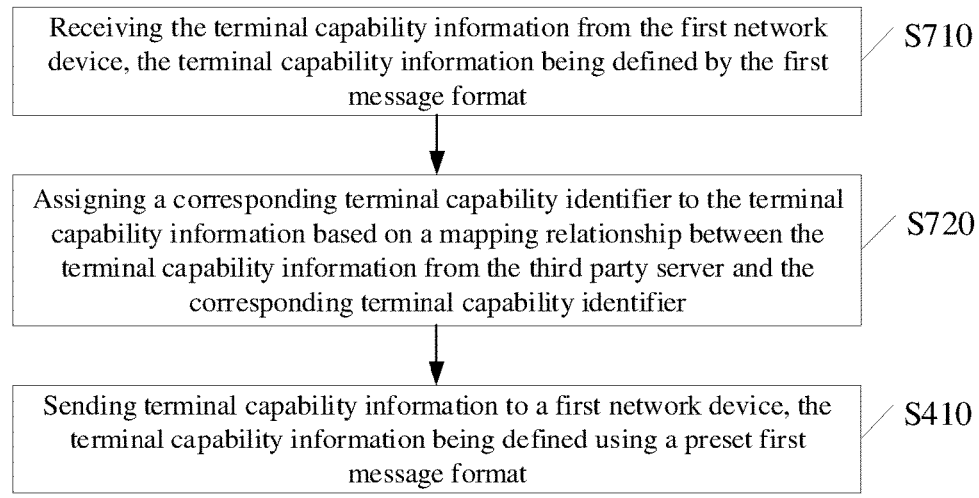
FIG. 7 is a flowchart of a method 700 of determining a terminal capability message format according to an embodiment of the present disclosure.

In a second way, a terminal capability identifier is assigned by the UE manufacturer. A method 700 for determining a terminal capability message format as shown in FIG. 7, before the step S410 above, further includes the followings.

S710: receiving the terminal capability information from the first network device, and the terminal capability information is defined using the first message format.

S720: assigning a corresponding terminal capability identifier to the terminal capability information based on a mapping relationship between the terminal capability information from the third party server and the corresponding terminal capability identifier.

Figure 8:
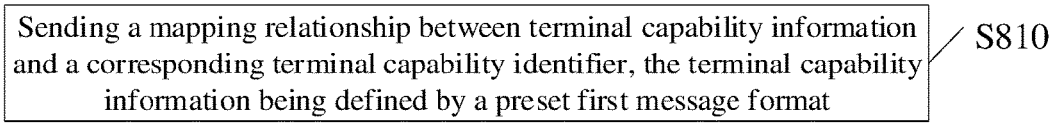
FIG. 8 is a flowchart of a method 800 for determining a terminal capability message format according to an embodiment of the present disclosure.

A method for determining a terminal capability message format is also provided by embodiments of the present disclosure, which can be applied to a third party server, such as a server of UE manufacturer. FIG. 8 is a schematic flowchart of another method 800 for determining a terminal capability message format according to an embodiment of the present disclosure, includes the followings.

S810: sending a mapping relationship between terminal capability information and a corresponding terminal capability identifier. The terminal capability information is defined by a preset first message format.

In at least one exemplary embodiment, the first message format is a format defined in TS 36.331 or a format defined in TS 38.331; or, a radio resource control RRC message format defined by new radio NR or an RRC message format defined by E-UTRAN; or a format associated with a core network or an access network.

In at least one exemplary embodiment, the format associated with a core or an access network includes a format associated with a mobility management node function MME; a format associated with an access and mobility management function AMF; a format associated with an access network node of NR type; or a format associated with an access network node of E-UTRA type.

It can be seen that each network node uses the preset first message format in the above-mentioned process of terminal capability identifier allocation and the whole process of terminal capability decoding. Therefore, NG-RAN nodes do not need to obtain different message formats to decode terminal capability information according to their own RAT types, which can reduce the complexity of terminal capability decoding. A method for determining a terminal capability message format also provided by embodiments of the present disclosure, which applied to a first network device, includes obtaining terminal capability information, the terminal capability information being defined using a preset message format; the preset message format being a first message format or a second message format; and decoding the terminal capability information using the preset message format.

In at least one exemplary embodiment, the first message format/second message format is a format defined in TS 36.331 or a format defined in TS 38.331; a radio resource control RRC message format defined by new radio NR or an RRC message format defined by E-UTRAN; or a format associated with a core network or an access network.

In at least one exemplary embodiment, the format associated with a core or an access network includes a format associated with a MME; a format associated with an AMF; a format associated with an access network node of NR type; or a format associated with an access network node of E-UTRA type.

In at least one exemplary embodiment, before obtaining the terminal capability information, further includes receiving a terminal capability identifier of the UE.

In at least one exemplary embodiment, the obtaining terminal capability information includes sending the terminal capability identifier to a third network device; and receiving the terminal capability information corresponding to the terminal capability identifier from the third network device.

In at least one exemplary embodiment, the decoding the terminal capability information using the preset message format includes selecting a message format corresponding to a third network device type according to the third network device type, or, selecting a message format corresponding to a first network device type according to a first network device type, or, selecting a message format according to indication information; and decoding of the terminal capability information using the selected message format.

In at least one exemplary embodiment, before receiving a terminal capability identifier from the UE, further includes receiving terminal capability information from the UE; selecting a message format corresponding to a third network device type according to the third network device type, or, selecting a message format corresponding to a first network device type according to a first network device type, or, selecting a message format according to indication information; and sending the terminal capability message defined using the selected message format to the third UE. A method for determining a terminal capability message format also provided by embodiments of the present disclosure, which applied to a second network device, includes sending terminal capability information to a third network device, the terminal capability information being defined using a preset message format. The preset message format is a first message format or a second message format.

In at least one exemplary embodiment, the first message format/second message format is a format defined in TS 36.331 or a format defined in TS 38.331; or, an RRC message format defined by new radio NR or an RRC message format defined by E-UTRAN; or a format associated with a core network or an access network.

In at least one exemplary embodiment, the format associated with a core or an access network includes a format associated with an MME; or, a format associated with an AMF; or a format associated with an access network node of NR type; or a format associated with an access network node of E-UTRA type.

In at least one exemplary embodiment, the sending terminal capability information to the third network device includes selecting a corresponding mapping relationship based on the third network device type, or a first network device type connected to the third network device, or indication information; obtaining the terminal capability information using the selected mapping relationship; and sending the terminal capability information to the third network device. A first mapping relationship is a mapping relationship between the terminal capability identifier and the terminal capability information defined using the first message format, and the second mapping relationship is a mapping relationship between the terminal capability identifier and the terminal capability information defined using the second message format.

In at least one exemplary embodiment, before receiving a UE terminal capability identifier from a third network device, the method further includes receiving terminal capability information from the third network device; the terminal capability information being defined using a preset message format; the preset message format being the first message format or the second message format; assigning a corresponding terminal capability identifier to the terminal capability information; and recording a mapping relationship between the terminal capability information and the terminal capability identifier. The mapping relationship is the first mapping relationship or the second mapping relationship.

In at least one exemplary embodiment, it further includes determining the preset message format defining the terminal capability information based on a third network device type, or a first network device type connected to the third network device, or indication information.

In at least one exemplary embodiment, for the same terminal capability information, a terminal capability identifier in the first mapping relationship is the same as or different from a terminal capability identifier in the second mapping relationship.

A method for determining a terminal capability message format also provided by embodiments of the present disclosure, which is applied to a third network device, includes receiving a UE terminal capability identifier from a first network device and sending the terminal capability identifier and category information of the first network device to a second network device, the first network device being connected to the third network device.

In at least one exemplary embodiment, before receiving a UE terminal capability identifier from a first network device, the method includes receiving terminal capability information of the UE from the first network device; and sending the terminal capability information and the category information of the first network device to the second network device.

A method for determining a terminal capability message format also provided by embodiments of the present disclosure, which is applied to a third party server, includes sending a first mapping relationship and/or a second mapping relationship to a second network device. The first mapping relationship is a mapping relationship between terminal capability information defined using a first message format and terminal capability identifier, and the second mapping relationship is a mapping relationship between terminal capability information defined using a second message format and terminal capability identifier.

In at least one exemplary embodiment, the first message format/the second message format is a format defined in TS 36.331 or a format defined in TS 38.331; or, a radio resource control RRC message format defined by new radio NR or an RRC message format defined by E-UTRAN; or a format associated with a core network or an access network.

In at least one exemplary embodiment, the format associated with a core network or an access network includes a format associated with an MME; or, a format associated with an AMF; or a format associated with an access network node of NR type; or a format associated with an access network node of E-UTRA type.

A method for determining a terminal capability message format also provided by embodiments of the present disclosure, which is applied to a UE, includes selecting a terminal capability identifier for the UE based on a first network type or a registered third network type; and sending the terminal capability identifier to the first network device. The terminal capability identifier is corresponding to a terminal capability message defined using a first message format, or the terminal capability identifier is corresponding to a terminal capability message defined using the second message format.

In at least one exemplary embodiment, the first message format/the second message format is a format defined in TS 36.331 or a format defined in TS 38.331; or, a radio resource control RRC message format defined by new radio NR or an RRC message format defined by E-UTRAN; or a format associated with a core network or an access network.

In at least one exemplary embodiment, the format associated with a core network or an access network includes a format associated with a MME; or, a format associated with an AMF; or a format associated with an access network node of NR type; or a format associated with an access network node of E-UTRA type.

With reference to the attached drawings, a detailed introduction with specific embodiments is described below.

Figure 9:
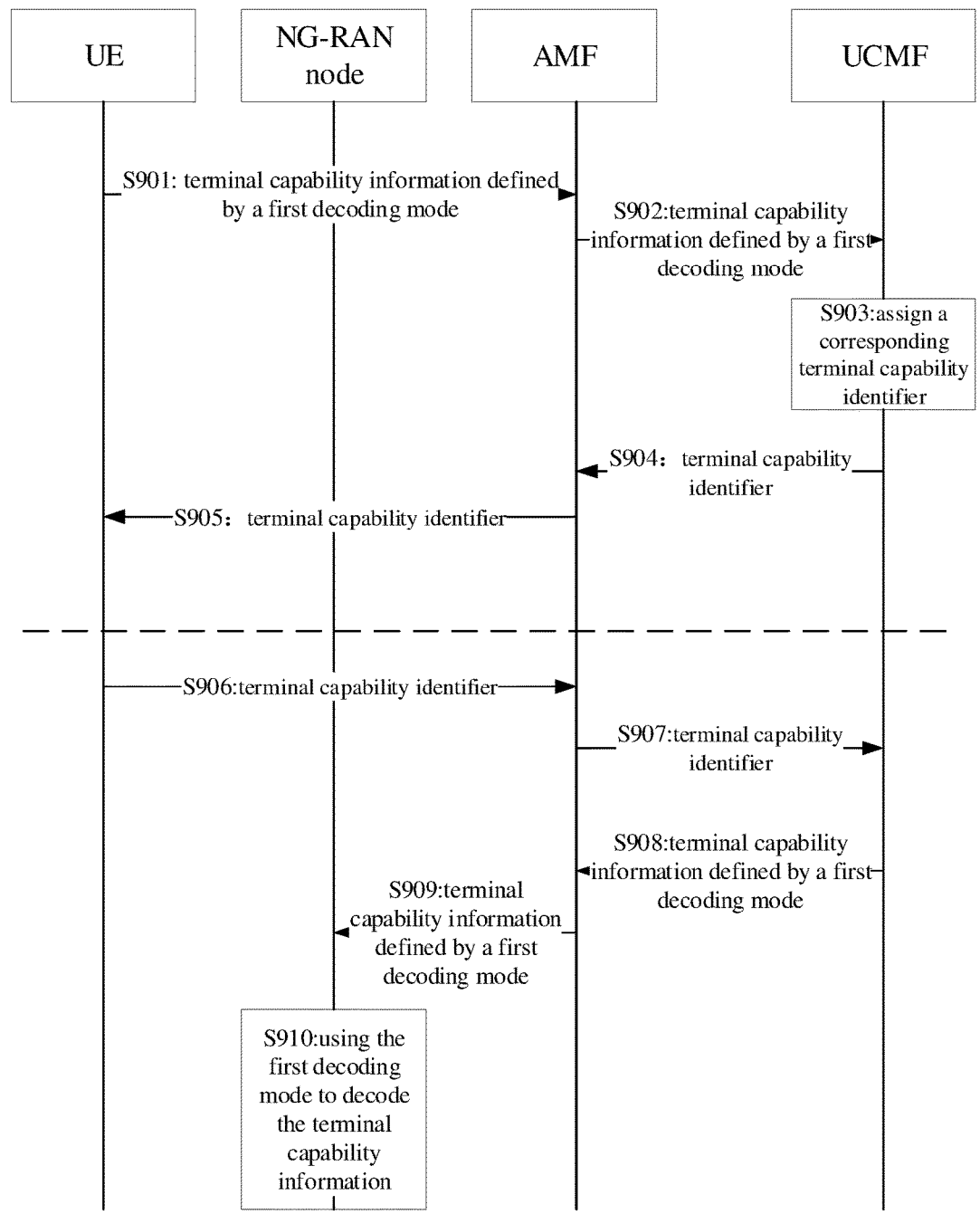
FIG. 9 is a flowchart of a method 900 for determining a terminal capability message format according to an embodiment of the present disclosure.

First embodiment. The embodiment corresponds to the way in which the terminal capability identifier is assigned by the UCMF. FIG. 9 is a schematic flowchart 900 according to the first embodiment of the present disclosure, including the followings.

S901: A UE sends terminal capability information to the NG-RAN node, which in turn transmits this terminal capability information defined using the preset first message format to the AMF.

S902: The AMF sends the terminal capability information defined with the preset first message format to the UCMF.

S903: The UCMF assigns a corresponding terminal capability identifier to the terminal capability information and records the mapping relationship between the terminal capability information and the corresponding terminal capability identifier.

S904: The UCMF feeds back the assigned terminal capability identifier to the AMF.

S905: The AMF sends the assigned terminal capability identifier to the UE.

The above process is the allocation process of terminal capability identifier. The following steps can be performed in the subsequent communication process.

S906: The UE sends the terminal capability identifier to the NG-RAN node, and the NG-RAN node then transmits this terminal capability identifier to the AMF.

S907: the AMF sends the terminal capability identifier to the UCMF.

S908: the UCMF looks up the above mapping relationship and obtains the terminal capability information corresponding to the terminal capability identifier, which is defined using the first message format; and returns this terminal capability information to the AMF.

S909: the AMF sends the terminal capability information defined in the first message format to the NG-RAN node.

S910: the NG-RAN node decodes the received terminal capability information using the above-mentioned first message format.

As can be seen, each node uses a preset first message format throughout the above process. The first message format can be defined by TS36.331 or TS38.331. The NG-RAN node uploads the terminal capability information defined using the preset first message format to the AMF; the AMF then transmits the terminal capability information to the UCMF. The UCMF assigns a corresponding terminal capability identifier to the terminal capability information. The format of the first message stored in the UCMF does not change. After the NG-RAN node obtains the terminal capability identifier and obtains the terminal capability information corresponding to the terminal capability identifier according to the terminal capability identifier, the NG-RAN node decodes the terminal capability information using the above-mentioned preset first message format.

For example, in accordance with TS38.331, the RAT-type field in the terminal capability information is defined in the following manner:
ASN1START
TAG-RAT-TYPE-START
RAT-Type::=ENUMERATED {nr, eutra-nr, eutra, spare1, . . . }
TAG-RAT-TYPE-STOP
ASN1STOP
in accordance with TS36.331, the RAT-type field in the terminal capability information is defined in the following manner:

```
-- ASN1START
RAT-Type ::=    ENUMERATED {
                eutra, utra, geran-cs, geran-ps, cdma2000-1XRTT,
                nr, eutra-nr, spare1, ...}
-- ASN1STOP
```

If the above first message format adopts the message format defined in TS38.331, the terminal capability information obtained by all types of NG-RAN nodes is defined by this message format. When decoding the terminal capability information, regardless of whether the NG-RAN node is NR type or E-UTRA type, the RAT-type field is decoded as: "RAT-Type::=ENUMERATED {nr, eutra-nr, eutra, spare1, . . . }".

If the above first message format adopts the message format defined in TS36.331, the terminal capability information obtained by all types of NG-RAN nodes is defined by this message format. When decoding the terminal capability information, regardless of whether the NG-RAN node is NR type or E-UTRA type, the RAT-type field is decoded as: "RAT-Type::=ENUMERATED {eutra, utra, geran-cs, geran-ps. regardless of whether the NG-RAN node is of NR type or E-UTRA type, cdma2000-1×RTT, nr, eutra-nr, spare1, . . . }".

Figure 10:
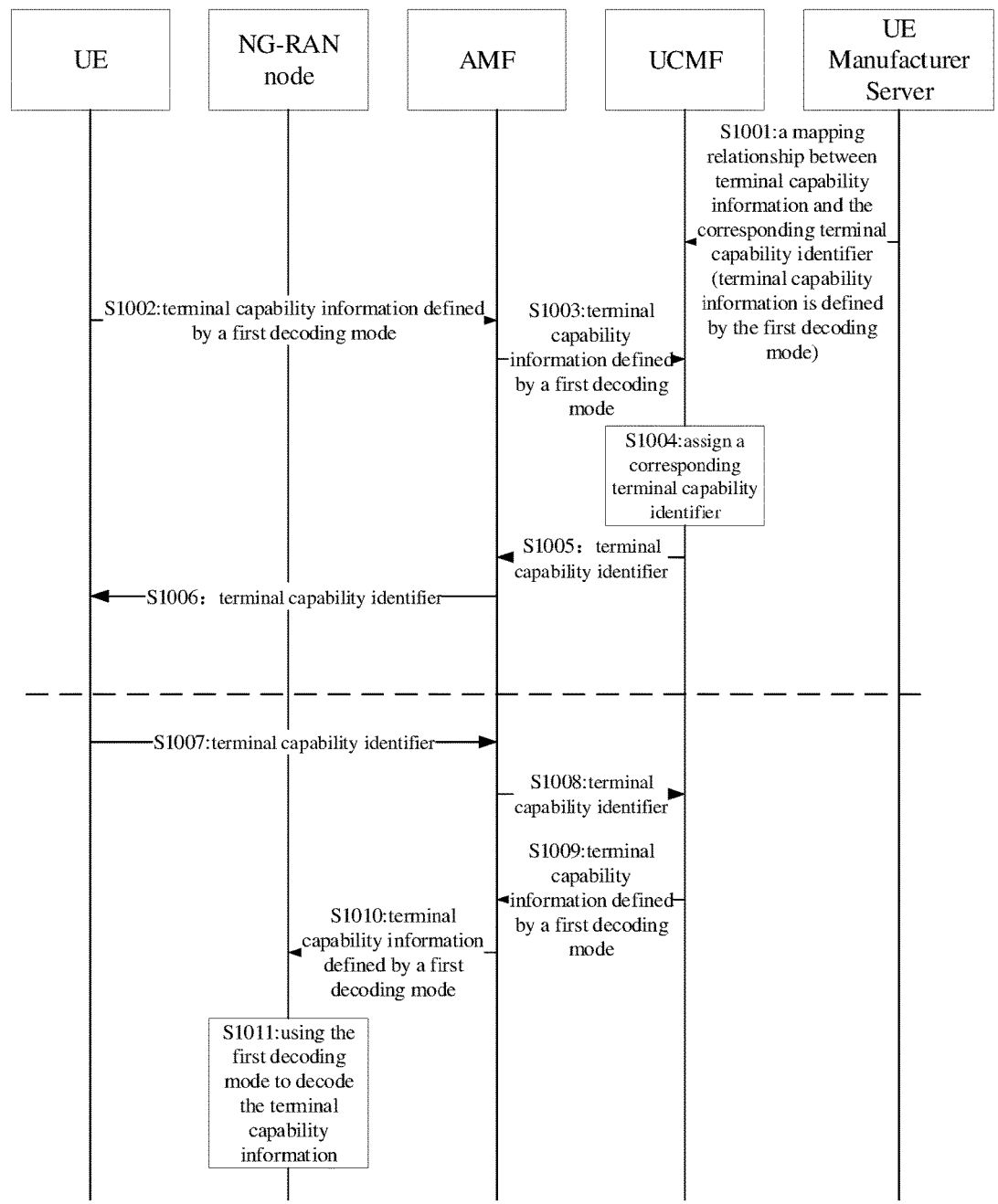
FIG. 10 is a flowchart according to a second embodiment of the present disclosure.

Second embodiment. This embodiment corresponds to the way in which the terminal capability identifier is assigned by the UE manufacturer. FIG. 10 is a schematic flowchart 1000 according to the second embodiment of the present disclosure, includes the followings.

S1001: the UE manufacturer server sends to the UCMF a mapping relationship between terminal capability information and the corresponding terminal capability identifier, where the terminal capability information is defined using a predefined first message format.

S1002: the UE sends the terminal capability information to the NG-RAN node, which in turn transmits this terminal capability information defined using the preset first message format to the AMF.

S1003: the AMF sends the terminal capability information defined with the predefined first message format to the UCMF.

S1004: the UCMF assigns a corresponding terminal capability identifier to this terminal capability information based on the above mapping relationship.

S1005: the UCMF feeds the assigned terminal capability identifier to the AMF.

S1006: the AMF sends the assigned terminal capability identifier to the UE.

The above process is the allocation process of terminal capability identifier. The following steps can be performed in the subsequent communication process.

S1007: the UE sends the terminal capability identifier to the NG-RAN node, and the NG-RAN node then transmits this terminal capability identifier to the AMF S1008: the AMF sends the terminal capability identifier to the UCMF S1009: the UCMF looks up the above mapping relationship and obtains the terminal capability information corresponding to this terminal capability identifier, which is defined using the first message format; and returns this terminal capability information to the AMF.

S1010: the AMF sends the terminal capability information defined in the first message format to the NG-RAN node, and the AMF can send the terminal capability information through an initial context setup request.

S1011: the NG-RAN node decodes the received terminal capability information using the above first message format.

As can be seen, each node uses a preset first message format throughout the above process. This first message format may be defined by TS36.331 or TS38.331. When the UE manufacturer server provides the UCMF with the mapping relationship between the terminal capability information and the corresponding terminal capability identifier, the terminal capability information may be defined using the preset first message format, which can be defined by TS36.331 or TS38.331. When the NG-RAN node obtains the terminal capability identifier and accordingly obtains the terminal capability information corresponding to the terminal capability identifier, the terminal capability information may be still defined using the predefined first message format. After obtaining the terminal capability information, the NG-RAN node adopts this first message format to decode this terminal capability information.

Third embodiment. The embodiment can be applied to the scenario where a 5G system and an evolved packet system (EPS) interoperate. In the embodiment, terminal capability information can be defined using two different message formats, respectively and two different mapping relationships which are used to indicate the two above-mentioned mapping relationships between terminal capability information defined using different message formats and terminal capability identifier. In the two different mapping relationships, the terminal capability identifiers corresponding to (but defined using different message formats) can be the same or different.

Among them, the above message formats can be related to the type of core network equipment (or related to the type of core network). For example, when the terminal is registered to the EPS system, and the core network equipment is Mobility Management Node Function (MME, Mobility Management Entity), the message format defined in TS36.331 is used; when the terminal is registered to the 5GS system, and the core network network equipment is AMF, the format way defined in TS38.331 is used.

Alternatively, the above message format can be related to the RAT type of the NG-RAN node (or related to the cell where the terminal resides). For example, when the terminal resides in an E-UTRAN cell, and the RAT type of the NG-RAN node connected to the terminal is of E-UTRA type, the message format defined by TS36.331 is used; when the terminal resides in an NR cell, and the RAT type of the NG-RAN node connected to the terminal is of NR type, the message format defined by TS38.331 is used.

Accordingly, the above mapping relationship may be a first mapping relationship or a second mapping relationship. In at least one exemplary embodiment, the first mapping relationship is a mapping relationship between terminal capability information and terminal capability identifier defined using the message format defined in TS38.331, and the second mapping relationship is a mapping relationship between terminal capability information and terminal capability identifier defined using the message format defined in TS36.331. For the same terminal capability information, the terminal capability identifier corresponding to this terminal capability information in the first mapping relationship may be the same as different from the terminal capability identifier corresponding to this terminal capability information in the second mapping relationship. That is, for the same terminal capability information, different terminal capability identifiers can be assigned to it for different definition methods, or the same terminal capability identifier can be assigned to it.

Figure 11:
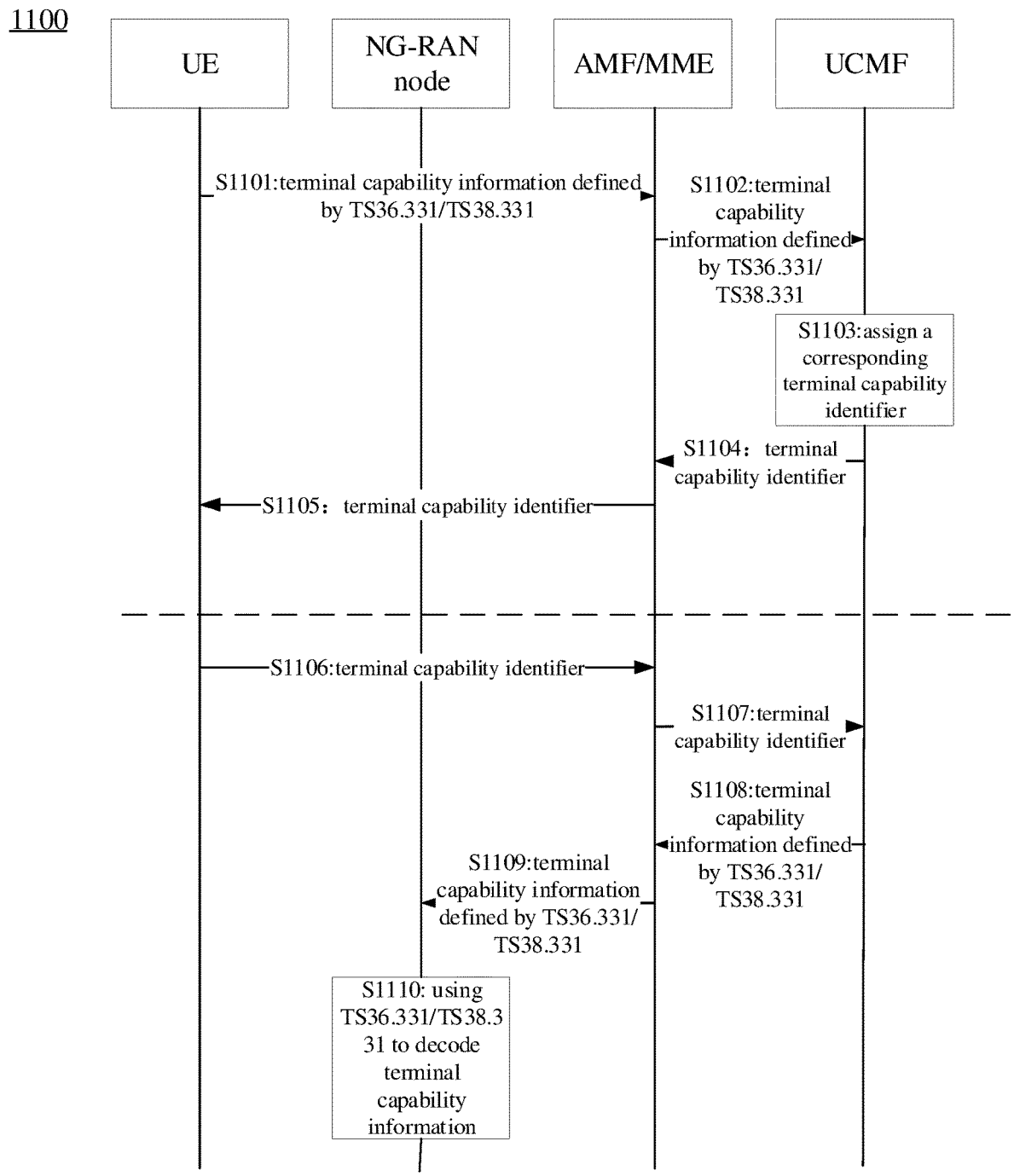
FIG. 11 is a flowchart according to a third embodiment of the present disclosure.

This embodiment corresponds to the way of assigning terminal capability identifiers by UCMF. FIG. 11 is a flowchart 1100 according to embodiment III of the present disclosure, includes the followings.

S1101: The UE sends terminal capability information to the NG-RAN node; the NG-RAN node selects the corresponding message format according to its own type (NR type or E-UTRA type), or according to the type of the core network network equipment (AMF or MME), and sends the terminal capability information defined using this message format to the core network network equipment. For example, if the core network network equipment is AMF, the terminal capability information defined using the message format defined in TS38.331 is sent to the core network network equipment; if the core network network equipment is MME, the terminal capability information defined using the message format defined in TS36.331 is sent to the core network network equipment. Alternatively, if the NG-RAN node is NR type, the terminal capability information defined using the message format defined in TS38.331 will be sent to the core network network equipment; if the NG-RAN node is of type E-UTRA, the terminal capability information defined using the message format defined in TS36.331 will be sent to the core network equipment.

S1102: the core network device sends the terminal capability information defined using this message format to the UCMF, and the core network device may further send the type information of the NG-RAN node and/or the type information of the core network device to the UCMF.

S1103: the UCMF assigns a corresponding terminal capability identifier to the terminal capability information and records the mapping relationship between the terminal capability information and the corresponding terminal capability identifier. For example, the first mapping relationship between the terminal capability information defined using the message format defined by TS38.331 and the corresponding terminal capability identifier is recorded, or the second mapping relationship between the terminal capability information defined by the message format defined by TS36.331 and the corresponding terminal capability identifier is recorded.

S1104: the UCMF feeds back the assigned terminal capability identifier to the core network network device. For example, the terminal capability identifier corresponding to the terminal capability information defined by the message format defined in TS38.331, or the terminal capability identifier corresponding to the terminal capability information defined by the message format defined in TS36.331 is fed back to the core network network device.

S1105: the core network network device sends the assigned terminal capability identifier to the UE.

The above process is the allocation process of terminal capability identifier. The following steps can be performed in the subsequent communication process.

S1106: the UE sends the terminal capability identifier to the NG-RAN node, and the NG-RAN node then transmits the terminal capability identifier to the core network network equipment. Where, when the UE sending the terminal capability identifier, selects the corresponding terminal capability identifier to be sent according to the type of the NG-RAN node or the type of the core network network equipment. For example, if the core network network equipment is AMF, the terminal capability identifier corresponding to the terminal capability information defined using the message format defined in TS38.331 is sent to the NG-RAN node, and if the core network network equipment is MME, the terminal capability identifier corresponding to the terminal capability information defined using the message format defined in TS36.331 is sent to the NG-RAN node. Alternatively, if the NG-RAN node is of NR type, the terminal capability identifier corresponding to the terminal capability information defined using the message format defined in TS38.331 will be sent to the NG-RAN node; if the NG-RAN node is of E-UTRA type, the terminal capability identifier corresponding to the terminal capability information defined using the message format defined in TS36.331 will be sent to the NG-RAN node.

S1107: the core network device sends the terminal capability identifier to the UCMF; and, the core network device may further send the type information of the NG-RAN node and/or the type information of the core network device to the UCMF.

S1108: the UCMF selects a mapping relationship based on the type information of the NG-RAN node or the type information of the core network network equipment, and looks up the mapping relationship to obtain the terminal capability information corresponding to the terminal capability identifier, and returns the terminal capability information to the core network equipment.

S1109: the core network network device sends this above terminal capability information to the NG-RAN node.

S1110: the NG-RAN node selects the message format according to the type information of the NG-RAN node or the type information of the core network network equipment and decodes the received terminal capability information using the selected message format.

The third embodiment is the way of assigning terminal capability identifier by UCMF. For the way of assigning terminal capability identifier by the UE manufacturer, the UE manufacturer server may send two mapping relationships, such as a first mapping relationship and a second mapping relationship, to the UCMF. In at least one exemplary embodiment, the first mapping relationship is a mapping relationship between terminal capability information and terminal capability identifier defined using the message format defined in TS38.331, and the second mapping relationship is a mapping relationship between terminal capability information and terminal capability identifier defined using the message format defined in TS36.331. The UCMF assigns the corresponding terminal capability identifier to the terminal capability information based on the first mapping relationship and the second mapping relationship. The UCMF assigns the corresponding terminal capability identifier to the terminal capability information based on the first mapping relationship and the second mapping relationship. The remaining steps are the same as those in the third embodiment, except for the aforementioned identifier allocation stage, and will not be repeated here.

Figure 12:
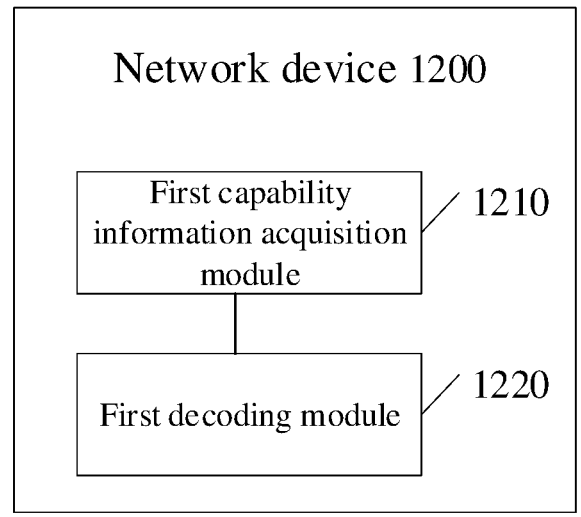
FIG. 12 is a schematic structure diagram of a network device 1200 according to an embodiment of the present disclosure.

A network device provided by embodiments of the present disclosure, FIG. 12 is a schematic structural diagram of a network device 1200 according to an embodiment of the present disclosure, includes a first capability information acquisition module 1210, configured to obtain terminal capability information, the terminal capability information being defined using a preset first message format; and a first decoding module 1220, configured to decode the terminal capability information using the first message format.

In at least one exemplary embodiment, the network devices is NG-RAN node.

In at least one exemplary embodiment, the first message format is a format defined in TS 36.331 or a format defined in TS 38.331; or, a radio resource control RRC message format defined by new radio NR or an RRC message format defined by E-UTRAN; or a format associated with a core network or an access network.

It should be understood that the above and other operations and/or functions of the module in the network device according to the embodiment of the present disclosure are intended to implement the corresponding processes of the first network device in the method of FIGS. 3 to 6, respectively, and will not be repeated herein for the sake of brevity.

Figure 13:
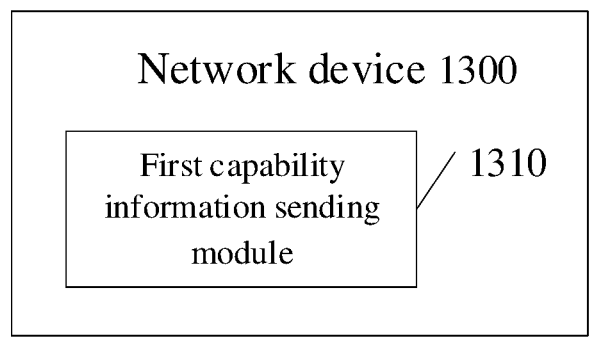
FIG. 13 is a schematic structure diagram of a network device 1300 according to an embodiment of the present disclosure.

Another network device provided by embodiments of the present disclosure, FIG. 13 is a schematic structural diagram of a serve 1300 according to an embodiment of the present disclosure, includes a first capability information sending module, configured to send terminal capability information to a first network device, the terminal capability information being defined using a preset first message format.

In at least one exemplary embodiment, the network device is UCMF.

In at least one exemplary embodiment, the first message format is a format defined in TS 36.331 or a format defined in TS 38.331; or, a radio resource control RRC message format defined by new radio NR or an RRC message format defined by E-UTRAN; or a format associated with a core network or an access network.

It should be understood that the above and other operations and/or functions of the modules in the network device according to the embodiments of the present disclosure are intended to implement the corresponding processes of the second network device in the method of FIGS. 3 to 6, respectively, and are not repeated herein for the sake of brevity.

Figure 14:
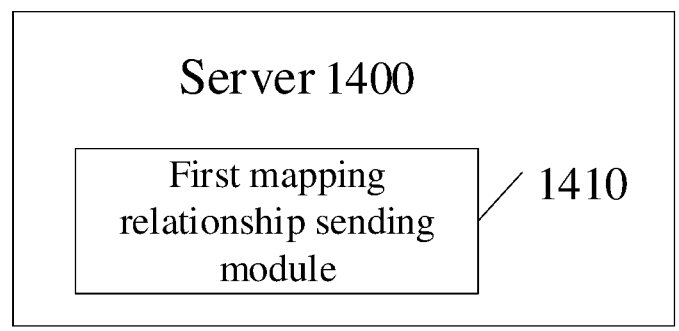
FIG. 14 is a schematic structure diagram of a server 1400 according to an embodiment of the present disclosure.

A server provided by embodiments of the present disclosure, FIG. 14 is a schematic structural diagram of a server 1400 according to an embodiment of the present disclosure, including a first mapping relationship sending module 1410, configured to send a mapping relationship between terminal capability information and a corresponding terminal capability identifier, the terminal capability information being defined using a predefined first message format.

It should be understood that the above and other operations and/or functions of the module in the server according to the embodiment of the present disclosure are intended to implement the corresponding processes of the third party server in the method of FIGS. 3 to 6, respectively, and are not repeated herein for the sake of brevity.

In at least one exemplary embodiment, the first message format is a format defined in TS 36.331 or a format defined in TS 38.331; or, a radio resource control RRC message format defined by new radio NR or an RRC message format defined by E-UTRAN; or a format associated with a core network or an access network.

A network device is provided by embodiments of the present disclosure, including a second capability information acquisition module, configured to obtain terminal capability information, the terminal capability information being defined using a preset message format; and a second decoding module, configured to decode the terminal capability information using the preset message format. The preset message format is a first message format or a second message format.

In at least one exemplary embodiment, the first message format/the second message format is a format defined in TS 36.331 or a format defined in TS 38.331; or, a radio resource control RRC message format defined by new radio NR or a RRC message format defined by E-UTRAN; or a format associated with a core network or an access network.

A network device is provided by embodiments of the present disclosure, including an identifier receiving module, configured to receive a terminal capability identifier of a UE from a first network device; and an indication module, configured to send the terminal capability identifier and category information of the first network device to a second network device, the first network device being connected to the network device.

A server is provided by embodiments of the present disclosure, which includes a second mapping relationship sending module, configured to send a first mapping relationship and/or a second mapping relationship to a second network device. The first mapping relationship is a mapping relationship between terminal capability information defined using a first message format and terminal capability identifier, and the second mapping relationship is a mapping relationship between terminal capability information defined using a second message format and terminal capability identifier.

In at least one exemplary embodiment, the first message format/the second message format is a format defined in TS 36.331 or a format defined in TS 38.331; or, a radio resource control RRC message format defined by new radio NR or a RRC message format defined by E-UTRAN; or a format associated with a core network or an access network.

A terminal device is provided by embodiments of the present disclosure, including a selection module, configured to select a terminal capability identifier for the UE based on a first network type or a registered third network type; and a sending module, configured to send the terminal capability identifier to the first network device. The terminal capability identifier corresponds to a terminal capability message defined using a first message format, or the terminal capability identifier corresponds to a terminal capability message defined using the second message format.

The first message format/the second message format is a format defined in TS 36.331 or a format defined in TS 38.331; or, a radio resource control RRC message format defined by new radio NR or an RRC message format defined by E-UTRAN; or a format associated with a core network or an access network.

Figure 15:
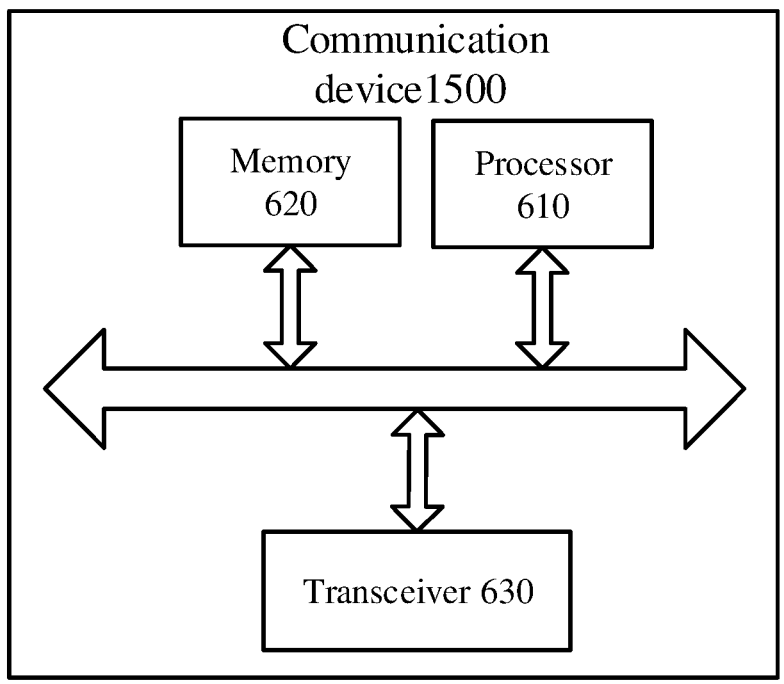
FIG. 15 is a schematic structural diagram of a communication device 1500 according to an embodiment of the present disclosure.

FIG. 15 is a schematic structural diagram of a communication device 1500 according to an embodiment of the present disclosure. The communication device 1500 shown in FIG. 15 includes a processor 610 that can call and run a computer program from memory to implement the method in the embodiment of the present disclosure.

In at least one exemplary embodiment, as shown in FIG. 15, the communication device 1500 may also include a memory 620. The processor 610 may call and run the computer program from the memory 620 to implement the method in the present disclosure embodiment.

The memory 620 may be a separate device from the processor 610 or may be integrated into the processor 610.

In at least one exemplary embodiment, as shown in FIG. 15, the communication device 1500 may also include a transceiver 630, which the processor 610 may control to communicate with other devices, specifically, to send information or data to, or receive information or data from, other devices.

Among other things, transceiver 630 may include a transmitter and a receiver. The transceiver 630 may further include an antenna, and the number of antennas may be one or more.

In at least one exemplary embodiment, the communication device 1500 may be a first network device of the present disclosure embodiment, and the communication device 1500 may implement the corresponding processes implemented by the first network device in the various methods of the present disclosure embodiment, which will not be described herein for brevity.

In at least one exemplary embodiment, the communication device 1500 may be the second network device of the present disclosure embodiment, and the communication device 1500 may implement the corresponding processes implemented by the second network device in each of the methods of the present disclosure embodiment, which will not be repeated herein for the sake of brevity.

In at least one exemplary embodiment, the communication device 1500 may be a third network device of the present disclosure embodiment, and the communication device 1500 may implement the corresponding processes implemented by the third network device in each of the methods of the present disclosure embodiment, which will not be repeated herein for the sake of brevity.

In at least one exemplary embodiment, the communication device 1500 may be a third-party server of the present disclosure embodiment, and the communication device 1500 may implement the corresponding processes implemented by the third-party server in each of the methods of the present disclosure embodiment, which will not be repeated herein for brevity.

In at least one exemplary embodiment, the communication device 1500 may be a terminal device of the present disclosure embodiment, and the communication device 1500 may implement the corresponding processes implemented by the terminal device in each of the methods of the present disclosure embodiment, which will not be repeated herein for brevity.

Figure 16:
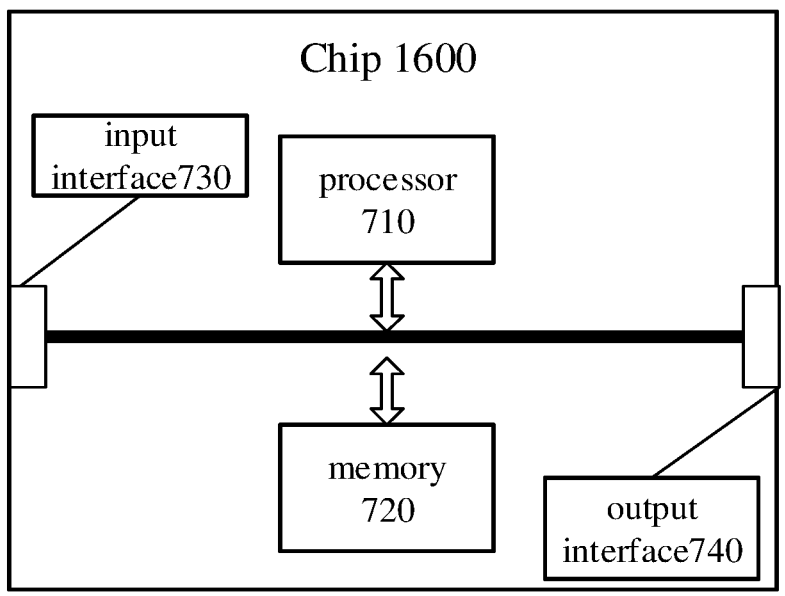
FIG. 16 is a schematic structural diagram of a chip 1600 according to an embodiment of the present disclosure.

FIG. 16 is a schematic structure diagram of a chip 1600 according to an embodiment of the present disclosure. The chip 1600 shown in FIG. 16 includes a processor 710, which can call and run a computer program from memory to implement the method in the present disclosure embodiment.

In at least one exemplary embodiment, as shown in FIG. 16, the chip 1600 may further include a memory 720. The processor 710 may call and run the computer program from the memory 720 to implement the method in the embodiment of the present disclosure.

Therein, the memory 720 may be a separate device from the processor 710 or may be integrated in the processor 710.

In at least one exemplary embodiment, the chip 1600 may also include an input interface 730, where the processor 710 may control the input interface 730 to communicate with other devices or chips, specifically, to obtain information or data sent by other devices or chips.

In at least one exemplary embodiment, the chip 1600 may also include an output interface 740, where the processor 710 may control the output interface 740 to communicate with other devices or chips, specifically, to output information or data to other devices or chips.

In at least one exemplary embodiment, the chip may be applied to the first network device in this application embodiment, and the chip may implement the corresponding processes implemented by the first network device in each method of this application embodiment, which will not be described herein for brevity.

In at least one exemplary embodiment, the chip can be applied to the second network device in this application embodiment, and the chip can implement the corresponding process implemented by the second network device in each method of this application embodiment, and for the sake of brevity, it will not be repeated here.

In at least one exemplary embodiment, the chip can be applied to the third network device in this application embodiment, and the chip can implement the corresponding process implemented by the third network device in each method of this application embodiment, and for the sake of brevity, it will not be repeated here.

In at least one exemplary embodiment, the chip can be applied to the third-party server in this application embodiment, and the chip can implement the corresponding processes implemented by the third-party server in each method of this application embodiment, which will not be repeated here for the sake of brevity.

In at least one exemplary embodiment, the chip can be applied to the terminal device in this application embodiment, and the chip can realize the corresponding process realized by the terminal device in each method of this application embodiment, and for the sake of brevity, it will not be repeated here.

The processors mentioned above may be general purpose processors, digital signal processors (DSP), field programmable gate arrays (FPGA), application specific integrated circuit (ASIC) or other programmable logic devices, transistor logic devices, discrete hardware components, etc. Among them, the above-mentioned general-purpose processor can be a microprocessor or can also be any conventional processor, etc.

The memory mentioned above may be volatile memory or non-volatile memory, or may include both volatile and non-volatile memory. Among them, the non-volatile memory may be read-only memory (ROM), programmable ROM (PROM), erasable programmable read-only memory (EPROM), electrically erasable programmable read-only memory (electrically EEPROM), or flash memory. The volatile memory may be random access memory (RAM).

It should be understood that the above memories are exemplary but not limiting descriptions, for example, the memories in embodiments of the present disclosure may also be static RAM (SRAM), dynamic RAM (DRAM), synchronous DRAM (SDRAM), double data rate SDRAM (DDR SDRAM), enhanced synchronous SDRAM (ESDRAM), synchronous link DRAM (SLDRAM), and direct memory bus random access memory (DRAM), and direct memory bus random access memory (Direct Rambus RAM, DR RAM), and so on. That is, the memories in the embodiments of the present disclosure are intended to include, but are not limited to, these and any other suitable types of memories.

In the above embodiments, this may be achieved in whole or in part by software, hardware, firmware, or any combination thereof. When implemented using software, it may be implemented in whole or in part in the form of a computer program product. The computer program product includes one or more computer instructions. When loaded and executed on a computer, the computer program instructions produce, in whole or in part, a process or function as described in an embodiment of the present disclosure. The computer may be a general purpose computer, a specialized computer, a computer network, or other programmable device. The computer instructions may be stored in a computer-readable storage medium or transmitted from one computer-readable storage medium to another computer-readable storage medium, e.g. the computer instructions may be transmitted from a web site, computer, server, or data center over a wired (e.g. coaxial cable, fiber optic, Digital Subscriber Line (DSL)) or wireless (DSL) connection. DSL or wirelessly (e.g. infrared, wireless, microwave, etc.) to another website site, computer, server, or data center. The computer-readable storage medium can be any available medium accessible by a computer or a data storage device such as a server, data center, etc. that contains one or more available media integrated. The available media may be magnetic media, (e.g. floppy disk, hard disk, tape), optical media (e.g. DVD), or semiconductor media (e.g. Solid State Disk (SSD)), etc.

It should be understood that in the various embodiments of the present disclosure, the size of the serial number of each of the above processes does not imply the order of execution, and the order of execution of each process should be determined by its function and inherent logic, and should not constitute any limitation to the processes implemented in the embodiments of the present disclosure.

It will be clear to those skilled in the subject matter that, for the convenience and brevity of the description, the specific working processes of the systems, devices and units described above can be referred to the corresponding processes in the preceding method embodiments, and will not be repeated herein.

The foregoing description only relates to specific embodiments of the present disclosure; however, the scope of protection of the present disclosure is not limited thereto, and changes or substitutions that can be readily think of by any person skilled in the art within the technical scope disclosed in the present disclosure shall be covered by the scope of protection of the present disclosure. Therefore, the scope of protection of the present disclosure shall be subject to the scope of protection of the claims.

What is claimed is:

1. A method for determining a terminal capability message format, applied to a second network device, comprising:

receiving terminal capability information from a third network device, the terminal capability information being defined by a preset message format, and the preset message format being a first message format or a second message format;

assigning a corresponding terminal capability identifier to the terminal capability information;

recording a mapping relationship between the terminal capability information and the terminal capability identifier, the mapping relationship being a first mapping relationship or a second mapping relationship;

receiving the terminal capability identifier of the terminal device from the third network device;

selecting a corresponding mapping relationship according to a type of the third network device type, wherein the type of the third network device comprises a mobility management node function (MME) or an access and mobility management function (AMF), and wherein the first mapping relationship is a mapping relationship between the terminal capability identifier and the terminal capability information defined by the first message format, and the second mapping relationship is a mapping relationship between the terminal capability identifier and the terminal capability information defined by the second message format;

obtaining the terminal capability information corresponding to the terminal capability identifier using the selected mapping relationship; and sending the terminal capability information to a first network device, the terminal capability information being defined by the preset message format.

* * * * *